United States Patent

Athanassiu et al.

[11] Patent Number: 4,466,455
[45] Date of Patent: Aug. 21, 1984

[54] ROLLING DIAPHRAGM VACUUM CONTROL WITH CHECK VALVE

[75] Inventors: Christos Athanassiu, Medford; Wilfred H. St. Laurent, Jr., Marblehead, both of Mass.

[73] Assignee: Bellofram Corporation, Burlington, Mass.

[21] Appl. No.: 442,704

[22] Filed: Nov. 18, 1982

Related U.S. Application Data

[63] Continuation-in-part of Ser. No. 251,470, Apr. 6, 1981, Pat. No. 4,390,036.

[51] Int. Cl.³ .................... F16K 7/02; F16K 31/126
[52] U.S. Cl. .................... 137/116.5; 137/625.38; 251/DIG. 2
[58] Field of Search ............. 137/116.5, 625.38; 251/DIG. 2

[56] References Cited

U.S. PATENT DOCUMENTS 2,720,218 10/1955 Otto .
2,720,378 10/1955 Otto .
3,070,108 12/1962 Fischer .
3,766,933 10/1973 Nicholson, Jr. .
4,092,998 6/1978 Taplin .

*Primary Examiner*—Arnold Rosenthal

[57] ABSTRACT

A vacuum controller for maintaining a defined vacuum pressure to a remote location, including a housing which defines a cavity. The controller includes means for connecting the cavity to the remote location, to a high vacuum, and to a control signal pressure. There is a cup-shaped plunger, having an opening in its side wall, which is adapted to reciprocate in the cavity, and there is a flexible diaphragm which seals between the housing and the plunger. The diaphragm also operates as a valving mechanism, such that, when the plunger moves in one direction, the diaphragm closes off the opening in the side wall of the plunger, and when the plunger moves in the other direction, it opens the opening. There is a check valve in said controller to prevent inversion of the diaphragms.

2 Claims, 2 Drawing Figures

ROLLING DIAPHRAGM VACUUM CONTROL WITH CHECK VALVE

BACKGROUND OF THE INVENTION

This application is a continuation-in-part of U.S. Ser. No. 251,470, "Rolling Diaphragm Vacuum Control" filed Apr. 6, 1981, now U.S. Pat. No. 4,390,036 which is hereby incorporated by reference.

There are several types of vacuum controllers which have been used with paper making machines. Most of these controllers provide some kind of valving which connects a part of the paper making machines, such as a flat box, either to a high vacuum or to atmosphere, in order to control the vacuum supply to the paper making machine.

U.S. Pat. No. 3,766,933 "Nicholson", issued Oct. 23, 1973, describes a vacuum controller of the prior art. The Nicholson patent shows a housing having several ports through its inner wall. There are plungers inside the housing, with a flexible diaphragm sealing between each plunger and the inner wall of the housing. In the Nicholson patent, a diaphragm performs no more than one valving function, opening or closing only one set of ports in the housing, and the only way fluid can move from one chamber to another is by flowing through a port in the inner wall of the housing. This results in a complicated apparatus having several chambers. It also requires that there be a separate flexible diaphragm and plunger for each valving function to be performed. The plungers move back and forth, opening and closing ports in response to pressure changes in the chambers surrounding the plungers.

In this art, it is desirable to make the controllers as sensitive as possible to pressure changes. Any resistance to movement of the plungers reduces the sensitivity of the controller and therefore should be eliminated if possible. The Nicholson controller has a plurality of flexible diaphragms which are used for sealing and valving, and each diaphragm offers a certain resistance to movement resulting in a reduction in sensitivity of the controller.

The controllers shown in the U.S. Ser. No. 251,470 are more sensitive than those of the prior art, but, in using a rolling diaphragm to perform both sealing and valving functions as shown in those references, it is possible to encounter a problem with inversion of the diaphragms in the event of a leak or an error in the start-up or shut-down of the controller which would permit the pressure on the back side of the diaphragm to be lower than the pressure on the front side of the diaphragm. Such an inversion of the diaphragms would cause the controller to be inoperable until it is taken apart and the diaphragms returned to their normal "right side out" position. This would reduce the reliability of the controller, which would be undesirable.

A main object of the present invention is to provide a reliable controller which is more sensitive than those available in the prior art. Another object is to simplify the design of the housing for the controller so as to reduce the cost of manufacture. Another object is to provide a design which permits a single diaphragm to serve more than one valving function, thereby reducing the number of valving-type diaphragms, which reduces the amount of resistance offered by the diaphragms. These and other objects will be obvious to one skilled in the art upon reading the description of the preferred embodiments.

SUMMARY OF THE INVENTION

A vacuum controller for maintaining a defined vacuum pressure to a remote location, including a housing which defines a cavity. The controller includes means for connecting the cavity to the remote location, to a high vacuum, and to a control signal pressure. There is a cup-shaped plunger, having an opening in its side wall, which is adapted to reciprocate in the cavity, and there is a flexible diaphragm which seals between the housing and the plunger. The diaphragm also operates as a valving mechanism, such that, when the plunger moves in one direction, the diaphragm closes off the opening in the side wall of the plunger, and when the plunger moves in the other direction, it opens the opening. There is a check valve between the chamber which is open to atmosphere and the chamber which is open to the control pressure.

DESCRIPTION OF THE PREFERRED EMBODIMENTS

Figure 1A:
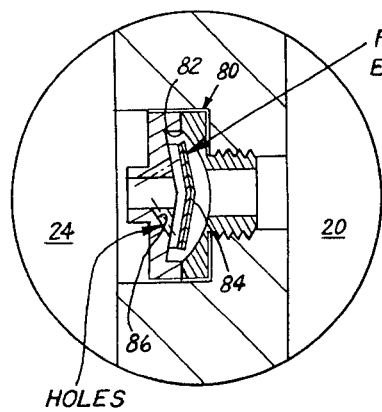
FIG. 1a is an enlarged sectional view of the check valve shown in FIG. 1.
Figure 1:
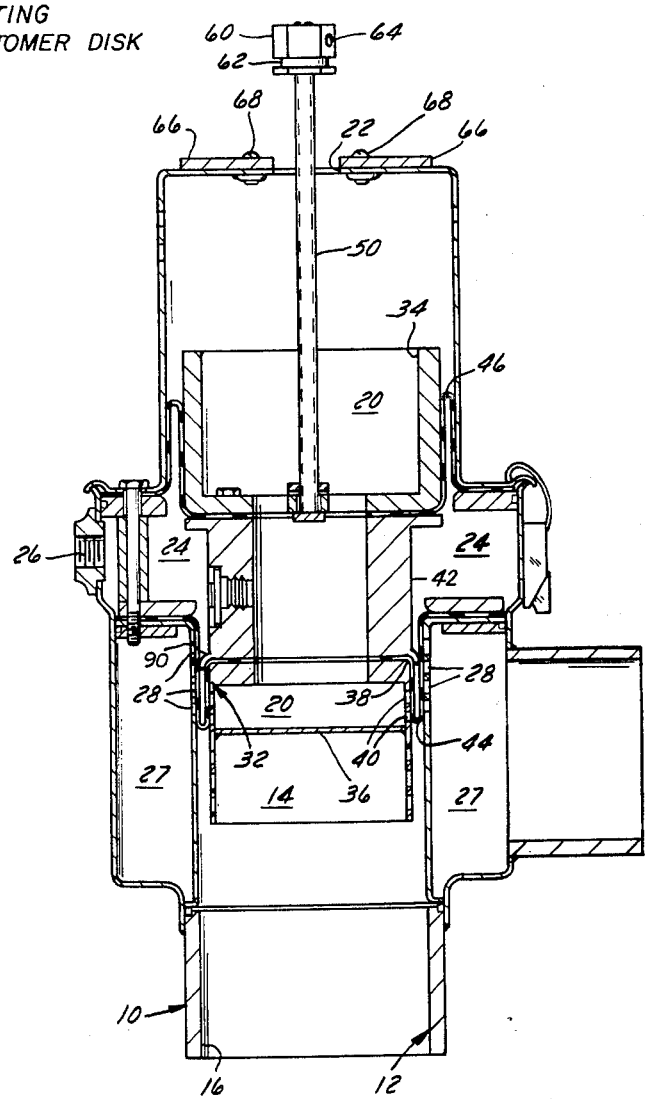
FIG. 1 is a cross-sectional view of the present invention.

FIG. 1 illustrates a generally cylindrical housing 10 which defines a cavity 12. Cavity 12 is divided into four chambers. Chamber 14 is in constant fluid communication with a remote location, which is the location at which the vacuum is to be regulated. Chamber 14 communicates with the remote location through port 16 by means of a pipe or some sort of conduit (not shown). Chamber 20 is in constant fluid communication with atmosphere through port 22. Chamber 24 is in constant fluid communication with a control signal pressure through screw connector 26. The control signal pressure would be a pressure greater than atmospheric pressure. Chamber 27 is in constant fluid communication with a high vacuum. Ports 28 provide a means for communication between the high vacuum and chamber 14. The high vacuum would generally be provided by a vacuum pump (not shown).

There are two plungers 32, 34 in cavity 12. Plunger 32 is cup-shaped and has a bottom wall 36 and a side wall 38 with openings 40 in side wall 38. A hollow rigid member 42 extends between plungers 32 and 34 and is attached at one end to plunger 34 and at the other end to plunger 32. Since the bottom of plunger 34 is open, chamber 20 extends through the rigid member 42 to the plunger 32. Flexible diaphragm 44 is clamped into housing 10 and to plunger 32 and provides a seal between plunger 32 and housing 10. Diaphragm 46 is clamped into housing 10 and to plunger 34 and provides a seal between plunger 34 and housing 10. Diaphragms 44 and 46 are both flexible so they can roll as plungers 32, 34 reciprocate in cavity 12, but diaphragm 44 is made of a heavier material than diaphragm 46, because diaphragm 44 also serves a valving function, which will be explained later, while diaphragm 46 is made of a lighter material as it serves only as a seal. The difference in materials in diaphragms 44, 46 is such that diaphragm 46 offers less resistance to movement than does diaphragm 44.

A check valve 80 is mounted in the wall between chambers 20 and 24 to permit fluid to flow from chamber 20 into chamber 24 but to prevent fluid from flowing from chamber 24 into chamber 20. The check valve 80 operates as a safety valve to provide that the pressure in chamber 24 (on the back side of the diaphragms 46, 44) is never lower than atmospheric pressure. This check valve 80 is important to the operation of the controller, because it provides that the pressure in chamber 24 will never be lower than the pressures on the other side of the diaphragms 46, 44, so that the diaphragms will never invert. The check valve 80 greatly improves the reliability of the controller over the reliability it would have without such a check valve.

During normal operation of the controller, the pressure in chamber 24 is always higher than the pressure in chamber 20, so no fluid passes through the check valve 80. However, if, for example, there were a small leak in the O-ring seal between chamber 27 and the control signal chamber 24, and if, during start-up, the controller were connected to the high vacuum and the remote location before being connected to the control signal pressure, it is possible that the pressure in chamber 24 would drop and begin to approach the pressure of the high vacuum. Without the check valve 80, this drop in pressure could result in the diaphragms being inverted or turned "inside out". However, with the check valve 80 in place, such an inversion of the diaphragms would be prevented, and, upon connecting chamber 24 to the control signal pressure, the controller would operate normally.

The check valve 80 is shown in greater detail in FIG. 1a and is made up of a chamber 82 in which is located a floating elastomer disk 84. The chamber 82 includes openings into chambers 20 and 24. If the pressure in chamber 24 is greater than the pressure in chamber 20 (which is normally the case), the elastomer disk 84 moves toward the chamber 20, closing the port to chamber 20, so there is no fluid communication between chambers 24 and 20. If the pressure in chamber 24 drops below atmospheric pressure (the pressure in chamber 20), the elastomeric disk 84 moves toward chamber 24 but does not close off holes 86 into chamber 24, so that fluid communication is open between chambers 20 and 24 through holes 86.

The controller of FIG. 1 also includes a curved lip retainer 90 which provides greater support for diaphragm 44 and serves as another means for preventing inversion of diaphragm 44.

The normal operation of the controller shown in FIG. 1 is as follows:

The movement of plungers 32, 34 is controlled by forces provided by the pressures in chambers 14, 20, 24 acting on plungers 32, 34. The pressure in chamber 20 is always fixed at atmospheric pressure, and the pressure in chamber 24 is always fixed at a predetermined pressure above atmospheric pressure. Therefore, the change of pressure which causes plungers 32, 34 to reciprocate inside cavity 12 is the change of pressure in chamber 14, which is the pressure of the remote location to be controlled. The control signal pressure in chamber 24 is fixed so that, when the remote location is at the proper pressure, plungers 32, 34 will be balanced so that diaphragm 44 will be sealed against housing 10 and against side wall 38 so as to close off ports 28 in the housing and openings 40 in the side wall 38.

When the pressure at the remote location becomes too high, the pressure in chamber 14 acting on bottom wall 36 of plunger 32 increases, causing plungers 32, 34 to move upward. This movement of plungers 32, 34 causes diaphragm 46 to unroll and causes diaphragm 44 to roll up, closing openings 40 and opening ports 28 for fluid communication between chamber 27 and chamber 14. This communication with the high vacuum will cause the pressure at the remote location to decrease, which in turn decreases the pressure in chamber 14 and causes plungers 32, 34 to move back down toward a balanced position.

When the pressure at the remote location is too low, the pressure in chamber 14 acting on bottom wall 36 will also be low, causing plungers 32, 34 to move downward toward chamber 14. This movement of plungers 32, 34 causes diaphragm 46 to roll up and causes diaphragm 44 to unroll, closing fluid communication through ports 28 and opening fluid communication through openings 40, so that atmosphere passes from chamber 20 through openings 40 into chamber 14, thereby increasing the pressure at the remote location.

The controller of FIG. 1 includes a manual override system, including center rod 50 attached to plunger 32. A hex fitting 60, having a groove 62 in its outer surface and a set screw 64 threaded through its radius, is threaded over center rod 50, and hex fitting 60 is locked onto center rod 50 by tightening set screw 64. Locks 66 are screwed into housing 10 by screws 68. In order to operate the manual override system, set screw 64 is loosened to unlock hex 60, and hex 60 is turned until groove 62 lines up with locks 66. Locks 66 are inserted into groove 62 and are fixed in that position by tightening screws 68. To achieve the desired position of plungers 32, 34, center rod 50 is held fixed by placing the end of a screw driver in slot 65 of center rod 50, and hex 60 is turned in the appropriate direction, either clockwise or counterclockwise, to move plungers 32, 34 as desired. The manual override system also provides a visual indicator of the location of the plungers.

While these figures have shown several specific embodiments of the present invention, various other features, shown in U.S. Pat. No. 4,092,998, which is hereby incorporated by reference, may be utilized in this invention. For example, a spring may be used, a slanting wall may be used in the housing and/or the side wall of the plunger, and an isolation chamber may be used for stabilizing the operation of the invention or damping when there are variations in pressure. Other modifications and variations of the above-described embodiments of the invention will also be obvious to those skilled in the art. Accordingly, within the scope of the appended claims, the invention may be practiced otherwise than as specifically described.

What is claimed is:

1. A pressure controller for maintaining a defined vacuum pressure to a remote location, comprising:
   a. a housing defining a cavity;
   b. first and second plungers adapted to reciprocate in said housing, said plungers being attached to each other by means of a hollow rigid member such that they move together, said first plunger including a side wall defining a port;
   c. first and second flexible diaphragms, acting to seal between said first plunger and said housing and between said second plunger and said housing, respectively;
   d. said housing, plungers and diaphragms defining first, second, third and fourth chambers in said cavity;

e. wherein said housing defines:
  i. a port into said first chamber for constant fluid communication with atmosphere;
  ii. a port into said second chamber for constant fluid communication with said remote location;
  iii. a port into said third chamber for constant fluid communication with a control signal pressure;
  iv. a port into said fourth chamber for constant fluid communication with a high vacuum;
  v. a port between said second and fourth chambers to permit fluid communication between them; and
f. valving means provided by said diaphragms for opening and closing fluid communication between said first and second chambers through the port in said plunger and between said second and fourth chambers through the port between them;
g. such that, if the pressure at said remote location is too low, the fluid pressures in said chambers will cause said plungers to move so that fluid communication is opened between said first and second chambers and is closed between said second and fourth chambers; and
h. such that, if the pressure at said remote location is too high, the fluid pressures in said chambers will cause said plungers to move to close fluid communication between said first and second chambers and to open fluid communication between said second and fourth chambers; and further comprising a check valve located in an opening between said first chamber and said third chamber to permit fluid to flow from said first chamber into said third chamber but to prevent fluid from flowing from said third chamber into said first chamber.

2. A pressure controller as recited in claim 1, further comprising a curved lip retainer mounted on said hollow rigid member for supporting one of said diaphragms.

* * * * *